United States Patent [19]

Chivens et al.

[11] 4,156,437

[45] May 29, 1979

[54] COMPUTER CONTROLLABLE MULTI-PORT VALVE

[75] Inventors: Clyde C. Chivens, Laguna Beach; Wayne J. Whistler, Glendora, both of Calif.

[73] Assignee: The Perkin-Elmer Corporation, Norwalk, Conn.

[21] Appl. No.: 879,214

[22] Filed: Feb. 21, 1978

[51] Int. Cl.² ............................................. F16K 11/02
[52] U.S. Cl. .............................. 137/554; 137/624.18; 137/625.41; 137/625.46; 251/161
[58] Field of Search ......................... 251/160, 161, 89; 137/625.46, 625.41, 624.18, 624.2, 625.11, 554

[56] References Cited

U.S. PATENT DOCUMENTS

| | | | |
|---|---|---|---|
| 2,051,155 | 8/1936 | Staegemann | 137/625.46 X |
| 3,048,675 | 8/1962 | Olson | 137/625.46 X |
| 3,074,431 | 1/1963 | Schwartz | 137/625.46 X |
| 3,752,167 | 8/1973 | Makabe | 137/625.41 X |
| 3,908,697 | 9/1975 | Witzel | 251/160 X |

FOREIGN PATENT DOCUMENTS 1334431 10/1973 United Kingdom ................ 137/625.46

Primary Examiner—Alan Cohan
Attorney, Agent, or Firm—Salvatore A. Giarratana; Francis L. Masselle; Edwin T. Grimes

[57] ABSTRACT

Developed primarily as a selector for use with a system for analyzing gases from any one of sixteen remote positions, the valve includes a platen containing on one surface sixteen circumferentially aligned input ports and one central output port. Rotatable adjacent the opposite surface of the platen is a selector manifold having a conduit that connects the central output port with any one of the input ports. To rotate the manifold to a new position, a solenoid connected to the rotating shaft on the manifold lifts the manifold from the platen while simultaneously engaging a clutch on a continuously rotating motor shaft. When the selector manifold reaches the desired sample position, identified precisely by the position of a digital encoder disc, the solenoid is released and a spring disengages the motor clutch and forces the selector manifold to seal against the selected port in the platen.

8 Claims, 4 Drawing Figures

U.S. Patent
May 29, 1979
4,156,437
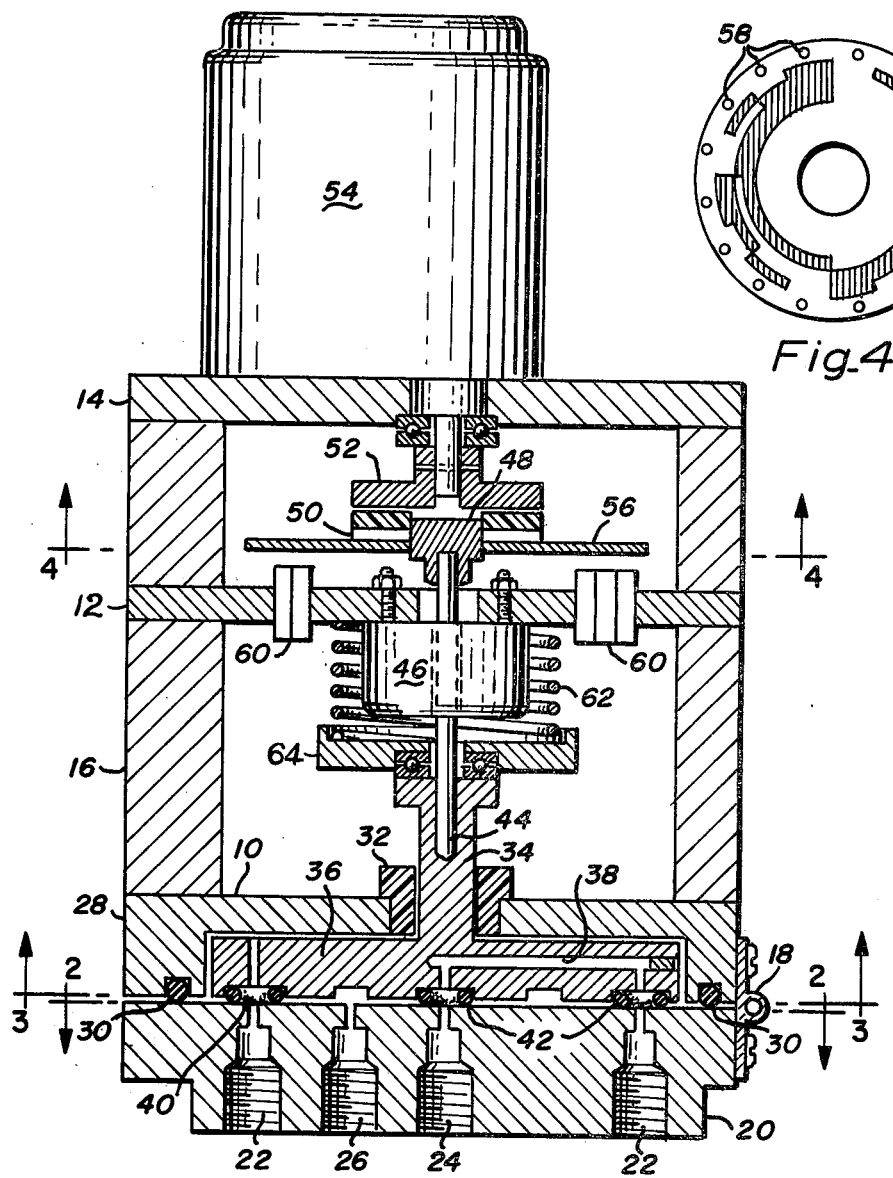
Fig. 4
Fig. 1
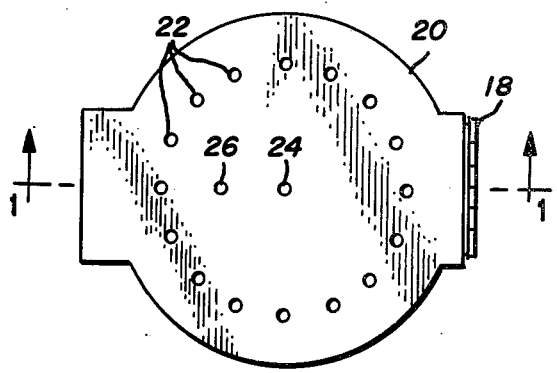
Fig. 2
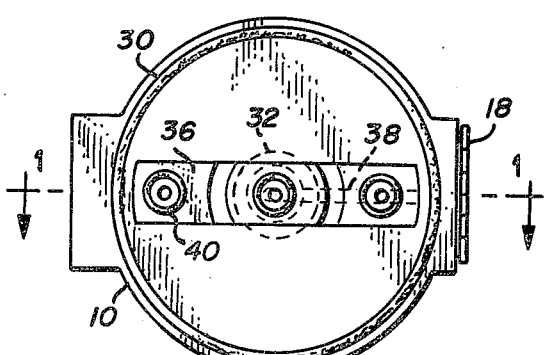
Fig. 3

COMPUTER CONTROLLABLE MULTI-PORT VALVE

SUMMARY OF THE INVENTION

This invention relates generally to multi-port fluid selection valves, and more particularly to an electrically operated valve for rapidly and precisely selecting one of a plurality of input ports.

The need often arises for a remotely controllable selector which will, on demand, become coupled to any one of a plurality of fluid conduits so that samples of the fluids may be drawn. One very important requirement for such a valving system is in the medical equipment field for the analysis of the various gases in respiratory samples. A relatively new medical technique involves the sampling of the gases in the airway of respiratory care patients. A capillary conduit continuously carries a small sample to a mass spectrometer in order to determine the percentage of oxygen, carbon dioxide, nitrogen, etc., carried in the airway.

A sampling switch that couples an analyzer, such as a mass spectrometer, to any one of a plurality of input tubes containing a gas or fluid to be analyzed, must necessarily provide a tight seal against the introduction of contaminating gases into the system from adjacent tubes or surrounding environment, and the seal must be reliable so that there is little chance of wear and consequent leakage that may result from wiping friction between the moving switching selector and the various input ports of the valve. Another important feature of an ideal switch is that it must have a minimum volume so that small selected samples can be directed into the analytical equipment without delay.

Briefly described, the present invention is for a selector valve having a platen provided on one surface with a centrally located output port and a plurality of input ports equally spaced and circumferentially positioned around the input port. A selector manifold having a conduit adapted to interconnect a selected input port with the output ports is forcibly positioned against the opposite surface of the platen and resilient "0" rings at the conduit ends provide a secure seal between the conduit and the ports. The manifold is connected by a rotatable shaft to a clutch plate, the corresponding plate of which is coupled to a continuously rotating motor. Also connected to the rotatable shaft is a digital encoder disc that provides a manifold position indication to external circuitry, and a solenoid which, when energized, lifts the shaft to engage it with the rotating motor while removing the selector manifold from the surface of the platen to provide wear of the "0" ring seals. The solenoid acts against a spring so that when the solenoid is de-energized, the spring will rapidly disengage the motor and force the seals at the ends of the conduit in the selector manifold against the output port and the newly selected input port.

BRIEF DESCRIPTION OF THE DRAWINGS

In the drawings which illustrate the preferred embodiment of the invention:

FIG. 1 is a sectional elevation view of the multi-port valve;

FIG. 2 is a plan view of the valve platen taken along the lines 2—2 of FIG. 1;

FIG. 3 is a plan view of the selector manifold taken along the lines 3—3 of FIG. 1; and FIG. 4 is a plan view of the encoder disc taken along the lines 4—4 of FIG. 1.

DETAILED DESCRIPTION

FIG. 1 is a sectional elevation view of the valve which includes a generally circular selector manifold housing 10, a solenoid mounting plate 12 and a motor mounting plate 14. Plates 12 and 14 are parallel to the housing 10 and are suitably separated from the housing and from each other by structural posts 16. Connected by a hinge 18 to the manifold housing 10 is an input port platen 20 which contains, in the preferred embodiment, sixteen evenly spaced input ports 22 circumferentially positioned around a centrally located output port 24, as best illustrated in FIG. 2. An additional port 26 is also provided to purge or evacuate the interior of the manifold housing 10, as will be subsequently described in connection with the operation of the valve. As illustrated in FIG. 1, each of the ports in the platen 20 is provided with a suitable threaded connection to enable the coupling between the port and external tubing.

The manifold housing 10 is cupped and inverted so that the rim portion 28 may be sealed by a suitable "0" ring 30 against the top surface of the platen 20. A shaft bearing 32 is mounted in housing 10 in a centrally located hole that is coaxial with the output port 24. Mounted for rotation within the shaft bearing 32 is a shaft 34, the end of which is connected to the selector manifold 36 which is positioned within the annular aperture of the housing 10. Manifold 36 contains a conduit 38 that interconnects the output port 24 with a selected input port 22. The conduit 38 is comprised of a long hole bored longitudinally through approximately one-half the length of the manifold 36 and two short lateral holes intersecting the long hole, one of the short holes being coaxial with the shaft 34 so that it will overlie the output port 24, the other short hole positioned on the manifold 36 so that it will overlie the input ports 22. After the holes are drilled, the entrance to the longer hole is sealed so that fluids entering the conduit 38 through an input port 22 wil leave only by way of the output port 24.

As shown in FIG. 1 and also FIG. 3, the bottom surface of the selector manifold 36 is slotted over the purging port 26 so that gas mixtures collected within the aperture of the manifold housing 10 may be withdrawn regardless of the position of the selector manifold 36. The selector manifold 36 is also provided with a dummy port 40 which is included in the manifold for balance purposes only. As best shown in FIG. 1, the two conduit holes and the dummy port hole in the manifold 36 are counterbored to accommodate small captive resilient "0" rings 42 which seal the conduit 38 of the manifold 36 securely against the surface of platen 20 to capture the input ports 22 and output port 24.

The principal object of the invention is to be able to rapidly rotate the selector manifold 36 from on input port to another while preventing frictional wear and consequent leakage of the "0" rings 42. This is accomplished by lifting the manifold 36 from the surface of the platen 20 whenever the manifold 36 is to be switched to a new input port 22. Therefore, the shaft 34 is suitably connected to the rotatable shaft 44 of a solenoid 46 so that when the solenoid 46 is energized by an external electrical source, the shaft 44 will cause the selector manifold 36 to be lifted from the surface of the platen 20. Solenoid 46 is connected to the solenoid mounting plate 12, which is provided with an aperture that is coaxial with the shaft 34. The shaft 44 of solenoid 46 extnds through the solenoid 46 and through the aperture in the solenoid mounting plate 12 and is connected to a hub 48 to which is attached a clutch plate 50. A corresponding clutch plate 52 is attached to the output shaft of a 60 r.p.m. motor 54 that is attached to the motor mounting plate 14. The coacting faces of clutch plates 50 and 52 are normally spaced apart approximately 0.02 inch and become engaged upon the energization of solenoid 46.

Connected to the hub 48 is a shaft position to digital encoder disc 56 as best illustrated in FIG. 4. Since, in the preferred embodiment of the invention, there are sixteen input ports, the encoder disc 56 will require four segmented concentric tracks, or four binary bits of information to properly identify the position of the selector manifold 36. In addition to merely identifying the position of the manifold, the encoder disc 56 must determine precisely when to disengage the solenoid 46 so that a conduit 38 in the manifold 36 will be aligned precisely over the center of an input port 22. Disc 56 is therefore provided with sixteen small locator spots 58 preferably located near the periphery of the disc 56 and radially aligned with the center of each of the sixteen sectors. In the preferred embodiment, the code pattern and the sixteen positioning spots 58 are plated with a reflective material and are read by LED/detector units 60 mounted to the solenoid mounting plate 12 and positioned adjacent each of the tracks in the disc, as shown in FIG. 1.

In operation, the selector manifold 36 is positioned so that the conduit 38 bridges between the output port 24 and one of the input ports 22. The manifold 36 is forced down against the surface of the platen 20 by the action of a spring 62 compressed between the solenoid mounting plate 12 and a plate 64 suitably coupled by thrust bearings and a collar at the end of the shaft 34. When it is desired to select a new input port, external circuitry that is coupled to the encoder disc 56 and also the solenoid 46, energizes the solenoid. When energized, solenoid 46 simultaneously lifts the manifold 36 against the force of the spring 62 and also engages clutch plate 50 against clutch plate 52 so that the continuously rotating motor 54 will rotate the manifold 36 to its new position as determined by the binary code on the encoder disc 56. When the LED/detector 60 detects the appropriate positioning spot 58 on the encoder disc, the external circuitry de-energizes the solenoid 46 so that the spring 62 will rapidly disengage the clutch plate 50 from the rotating clutch plate 52 and also force manifold 36 into the proper position over the selected input port 22 in platen 20.

Having thus described the preferred embodiment of our invention, what we claim is:

1. An electrically controllable multi-port fluid valve comprising:
   a platen having on its first surface a centrally positioned first port and a plurality of second ports equally spaced from said first port;
   a rotatable selector manifold positioned adjacent the second surface of said platen, said manifold having a conduit adapted to interconnect and seal against said first port and one of said second ports;
   a motor;
   a clutch coupled to the shaft of said motor;
   a rotatable shaft interconnecting said rotatable selector manifold with said clutch;
   electrically actuated means for lifting said rotatable selector manifold from the second surface of said platen, the lifting of said manifold being transmitted through said rotatable shaft to force engagement of said clutch; and
   means for urging said manifold against the second surface of said platen upon de-energization of said electrically actuated means.

2. The valve claimed in claim 1 further including position indicating means coupled to said rotatable shaft for identifying the position of said manifold.

3. The valve claimed in claim 2 wherein said electrically actuated means comprises a solenoid having a rotatable solenoid shaft coupled between said clutch and said manifold.

4. The valve claimed in claim 3 wherein said manifold is sealed against the second surface of said platen with resilient "O" rings positioned around the terminals of said conduit.

5. The valve claimed in claim 4 further including a purging port in said platen for removing from the valve fluids that were not selected by said manifold.

6. The valve claimed in claim 5 wherein said rotatable manifold includes a dummy port and "O" ring for balancing said manifold.

7. The valve claimed in claim 4 wherein said position indicating means comprises a shaft position to digital encoder disc having a binary count capable of identifying the position of each of said second ports, said disc further having indicia for precisely identifying the location of each of said second ports.

8. The valve claimed in claim 7 wherein said encoder disc is encoded with a reflective code pattern sensed by LED/detector elements positioned adjacent said reflective pattern.

* * * * *